(12) United States Patent
Chen et al.

(10) Patent No.: US 11,281,895 B2
(45) Date of Patent: Mar. 22, 2022

(54) EXPRESSION RECOGNITION METHOD, COMPUTER DEVICE, AND COMPUTER-READABLE STORAGE MEDIUM

(71) Applicant: BOE Technology Group Co., Ltd., Beijing (CN)

(72) Inventors: Guannan Chen, Beijing (CN); Yanhong Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/916,268

(22) Filed: Jun. 30, 2020

(65) Prior Publication Data
US 2021/0012096 A1    Jan. 14, 2021

(30) Foreign Application Priority Data
Jul. 11, 2019    (CN) .......................... 201910626366.2

(51) Int. Cl.
*G06K 9/00*    (2006.01)
*G06T 7/11*    (2017.01)
(Continued)

(52) U.S. Cl.
CPC ..... *G06K 9/00302* (2013.01); *G06K 9/00281* (2013.01); *G06K 9/46* (2013.01);
(Continued)

(58) Field of Classification Search
CPC .. G06K 9/00302; G06K 9/00281; G06K 9/46; G06K 9/4628; G06K 9/6271;
(Continued)

(56) References Cited

U.S. PATENT DOCUMENTS 5,680,481 A * 10/1997 Prasad ............... G06K 9/00281
382/190
7,272,243 B2 * 9/2007 Toyama ............. G06K 9/00228
348/135
(Continued)

FOREIGN PATENT DOCUMENTS

CN    102467658 A  *  5/2012
CN    104766063 A    7/2015
(Continued)

OTHER PUBLICATIONS

Emotion Recognition based on Texture Analysis of Facial Expression, Gyanendra K. Verma et al., IEEE, 978-1-61284-861-7, 2011, pp. 1-6. (Year: 2011).*

(Continued)

*Primary Examiner* — Jayesh A Patel
(74) *Attorney, Agent, or Firm* — Nath, Goldberg & Meyer; Joshua B. Goldberg

(57) ABSTRACT

The present disclosure provides an expression recognition method, a computer device, and a computer-readable storage medium. The expression recognition method includes: obtaining a facial image to be recognized; preprocessing the facial image to be recognized to obtain a preprocessed facial image; obtaining a first output image according to the preprocessed facial image, wherein the first output image at least represents a texture feature of the facial image to be recognized; obtaining a second output image according to the first output image, wherein the second output image at least represents a structural feature of organs of the facial image to be recognized; and determining an expression category corresponding to the facial image to be recognized, according to the second output image.

19 Claims, 7 Drawing Sheets

(51) Int. Cl.
*G06K 9/46* (2006.01)
*G06T 5/20* (2006.01)

(52) U.S. Cl.
CPC .............. *G06T 5/20* (2013.01); *G06T 7/11* (2017.01); *G06T 2207/20021* (2013.01); *G06T 2207/20084* (2013.01)

(58) Field of Classification Search
CPC ............. G06K 9/6268; G06K 9/00221; G06K 9/00597; G06T 7/11; G06T 5/20; G06T 2207/20021; G06T 2207/20084
See application file for complete search history.

(56) References Cited

U.S. PATENT DOCUMENTS

| | | | | |
|---|---|---|---|---|
| 10,102,421 | B2* | 10/2018 | Zhou | G06K 9/00744 |
| 10,401,860 | B2* | 9/2019 | Krupat | G10L 25/63 |
| 10,504,268 | B1* | 12/2019 | Huang | G06K 9/00302 |
| 2006/0008150 | A1* | 1/2006 | Zhao | G06K 9/00248 382/190 |
| 2011/0052074 | A1* | 3/2011 | Hayaishi | G06F 16/58 382/190 |
| 2014/0086457 | A1* | 3/2014 | Shah | G06K 9/00221 382/118 |
| 2014/0369571 | A1* | 12/2014 | Tsukizawa | G06K 9/00281 382/118 |
| 2015/0205997 | A1* | 7/2015 | Ma | G06K 9/00261 382/118 |
| 2015/0363634 | A1* | 12/2015 | Yin | G06K 9/00221 382/118 |
| 2017/0330029 | A1* | 11/2017 | Turcot | G06K 9/00308 |
| 2018/0190377 | A1* | 7/2018 | Schneemann | G06K 9/00275 |
| 2018/0211096 | A1* | 7/2018 | Cao | G06K 9/00268 |
| 2018/0289334 | A1* | 10/2018 | De Brouwer | G06K 9/00288 |
| 2019/0026954 | A1* | 1/2019 | Vats | G06T 11/001 |
| 2020/0090392 | A1* | 3/2020 | Chou | G06F 3/012 |
| 2020/0151940 | A1* | 5/2020 | Yu | G06T 15/04 |
| 2020/0302286 | A1* | 9/2020 | Nam | G06N 3/0481 |

FOREIGN PATENT DOCUMENTS

| | | | |
|---|---|---|---|
| CN | 105844221 | A * | 8/2016 |
| CN | 106257489 | A | 12/2016 |
| CN | 106600538 | A | 4/2017 |
| CN | 106778563 | A | 5/2017 |
| CN | 107330359 | A | 11/2017 |
| CN | 107742117 | A | 2/2018 |
| CN | 107895150 | A | 4/2018 |
| CN | 108615010 | A * | 10/2018 |
| CN | 108615010 | A | 10/2018 |
| CN | 109492529 | A | 3/2019 |
| CN | 109902590 | A | 6/2019 |

OTHER PUBLICATIONS

Extraction of Facial Regions and Features Using Color and Shape Information. Karin Sobottka et al., IEEE, 1015, 4651, 1996, pp. 421-425 (Year: 1996).*
FaceNet2ExpNet: Regularizing a Deep Face Recognition Net for Expression Recognition, Hui Ding et al., IEEE, 978-1-5090-4023-0, 2017, pp. 118-126 (Year: 2017).*
Dynamic Texture Recognition Using Local Binary Patterns with an Application to Facial Expressions, Guoying Zhao et al., IEEE, 0162-8828, 2007, pp. 915-928 (Year: 2007).*
Face Recognition Using Eigen Faces and Artificial Neural Network, Mayank Aarwal et al., IRCSIT, Aug. 2010, pp. 624-629. (Year: 2010).*
Preprocessing of Face Images: Detection of features and Pose Normalization, Daniel Reisfeld et al., Computer vision and Image Understanding, IV970640, 1998, pp. 413-430 (Year: 1998).*
First Office Action dated Dec. 9, 2020, for corresponding Chinese application No. 201910626366.2.
Zhao, K. et al., "Deep Region and Multi-label Learning for Facial Action Unit Detection".
Georgescu, M. et al., "Local Learning with Deep and Handcrafted Features for Facial Expression Recognition", Mar. 12, 2020.
Zhang, J. et al., "Multiple Convolutional Neural Networks for Facial Expression Sequence Recognition", Journal of Xidian University, vol. 45, No. 1, Feb. 2018, pp. 150-155.
Xinya, N., "Research of deep learning for facial expression recognition", South China University of Technology, Apr. 2016.
He, J., "Research on extraction of facial expression features and hierarchical classification", Hefei University of Technology, Apr. 2015.

* cited by examiner

EXPRESSION RECOGNITION METHOD, COMPUTER DEVICE, AND COMPUTER-READABLE STORAGE MEDIUM

CROSS-REFERENCE TO RELATED APPLICATIONS

The present application claims priority to Chinese Patent Application No. 201910626366.2, filed on Jul. 11, 2019, the content of which is hereby incorporated herein by reference in its entirety.

TECHNICAL FIELD

The present disclosure relates to the field of image processing technology, more particularly, to an expression recognition method, a computer device, and a computer-readable storage medium.

BACKGROUND

Facial feature recognition is a hot technology in biological pattern recognition in recent years. This technology requires a detection and localization of facial feature points of a human face for applications such as face matching and expression analysis based on these feature points. Expression recognition is a difficult problem in the field of facial feature recognition technology. With the rise of deep learning, target recognition also breaks through the bottleneck of traditional algorithms. Therefore, target recognition has become a hot concern in the field of facial feature recognition in recent years.

SUMMARY

According to one aspect of the present disclosure, provided is an expression recognition method, including: obtaining a facial image to be recognized; preprocessing the facial image to be recognized to obtain a preprocessed facial image; obtaining a first output image according to the preprocessed facial image, wherein the first output image at least represents a texture feature of the facial image to be recognized; obtaining a second output image according to the first output image, wherein the second output image at least represents a structural feature of organs of the facial image to be recognized; and determining an expression category corresponding to the facial image to be recognized, according to the second output image.

According to an embodiment of the present disclosure, obtaining the first output image according to the preprocessed facial image, includes: performing a first partition convolution process on a first input image to obtain the first output image, wherein the first input image is obtained based on the preprocessed facial image.

According to an embodiment of the present disclosure, performing the first partition convolution process on the first input image to obtain the first output image, includes: dividing the first input image into a plurality of first regions arranged in rows and columns; performing feature extraction on each first region of the plurality of first regions to obtain a first regional feature image corresponding to the first region; wherein a size of the first regional feature image is smaller than a size of the preprocessed facial image; and combining all of first regional feature images to generate the first output image with a same size as the preprocessed facial image.

According to an embodiment of the present disclosure, dividing the first input image into the plurality of first regions arranged in rows and columns, includes: performing a first convolution process on the first input image to obtain a first feature image; and dividing the first feature image into the plurality of first regions arranged in rows and columns.

According to an embodiment of the present disclosure, dividing the first input image into the plurality of first regions arranged in rows and columns, includes: dividing the first input image into the plurality of first regions which are of a same size and shape and arranged in rows and columns; and/or dividing the first input image into 16 first regions arranged in 4 rows and 4 columns.

According to an embodiment of the present disclosure, performing the feature extraction on the first region to obtain the first regional feature image, includes: performing a batch normalization (BN) process on the first region, to obtain a first normalized image of the first region; activating the first normalized image to obtain a first activated image; and performing a second convolution process on the first activated image to obtain the first regional feature image.

According to an embodiment of the present disclosure, before performing the first partition convolution process on the first input image to obtain the first output image, the expression recognition method further includes: performing a third partition convolution process on a third input image to obtain a third output image; wherein the third input image is obtained based on the preprocessed facial image, and the first input image is obtained based on the third output image.

According to an embodiment of the present disclosure, performing the third partition convolution process on the third input image to obtain the third output image, includes: dividing the third input image into a plurality of third regions arranged in rows and columns; performing feature extraction on each third region of the plurality of third regions to obtain a third regional feature image corresponding to the third region; wherein a size of the third regional feature image is smaller than a size of the preprocessed facial image; and combining all of third regional feature images to generate the third output image with a same size as the preprocessed facial image.

According to an embodiment of the present disclosure, dividing the third input image into the plurality of third regions arranged in rows and columns, includes: performing a first convolution process on the third input image to obtain a third feature image; and dividing the third feature image into the plurality of third regions arranged in rows and columns.

According to an embodiment of the present disclosure, dividing the third input image into the plurality of third regions arranged in rows and columns, includes: dividing the third input image into 16 third regions arranged in 4 rows and 4 columns.

According to an embodiment of the present disclosure, obtaining the second output image according to the first output image, includes: performing a second partition convolution process on a second input image to obtain the second output image, wherein the second input image is obtained based on the first output image.

According to an embodiment of the present disclosure, performing the second partition convolution process on the second input image to obtain the second output image, includes: dividing the second input image into a plurality of second regions based on positions of key organs on a face, so that the key organs are located in different second regions of the plurality of second regions; performing feature extraction on each second region of the plurality of second regions to obtain a second regional feature image corresponding to the second region; wherein a size of the second regional feature image is smaller than a size of the preprocessed facial image; and combining all of second regional feature images to generate the second output image with a same size as the preprocessed facial image.

According to an embodiment of the present disclosure, dividing the second input image into the plurality of second regions, includes: performing a first convolution process on the second input image to obtain a second feature image; and dividing the second feature image into the plurality of second regions.

According to an embodiment of the present disclosure, dividing the second input image into the plurality of second regions, includes: dividing the second input image into 3 second regions arranged in 3 rows and 1 column, wherein the 3 second regions respectively correspond to eyes, a nose and a mouth in the facial image to be recognized.

According to an embodiment of the present disclosure, performing the feature extraction on the second region to obtain the second regional feature image, includes: performing a BN process on the second region, to obtain a second normalized image of the second region; activating the second normalized image to obtain a second activated image; and performing a second convolution process on the second activated image to obtain the second regional feature image.

According to an embodiment of the present disclosure, preprocessing the facial image to be recognized to obtain the preprocessed facial image, includes: performing an image enhancement process on the facial image to be recognized to obtain an enhanced facial image.

According to an embodiment of the present disclosure, preprocessing the facial image to be recognized to obtain the preprocessed facial image, includes: performing low-pass filtering on the facial image to be recognized to obtain a low-frequency image; acquiring a difference image between the facial image to be recognized and the low-frequency image; and determining a weighted sum of the difference image and the facial image to be recognized as the preprocessed facial image.

According to an embodiment of the present disclosure, determining the expression category corresponding to the facial image to be recognized, according to the second output image, includes: performing a third convolution process on the second output image to obtain an output feature image; performing a global average pooling process on the output feature image to obtain a pooled feature image; determining confidence levels respectively corresponding to respective preset expression categories according to the pooled feature image; and determining the expression category corresponding to the facial image to be recognized, according to the confidence levels respectively corresponding to the respective preset expression categories.

According to another aspect of the present disclosure, provided is a computer device, including one or more processors; and a memory, on which one or more programs are stored; wherein the one or more programs is configured, when executed by the one or more processors, to implement the expression recognition method according to the present disclosure.

According to yet another aspect of the present disclosure, provided is a computer-readable storage medium having computer instructions stored thereon that, when executed by a processor, cause the processor to implement the expression recognition method according to the present disclosure.

DETAILED DESCRIPTION

The specific embodiments of the present disclosure will be described in detail below with reference to the drawings. It should be understood that the specific embodiments described herein are only used to illustrate and explain the present disclosure, and are not intended to limit the present disclosure.

Figure 1:
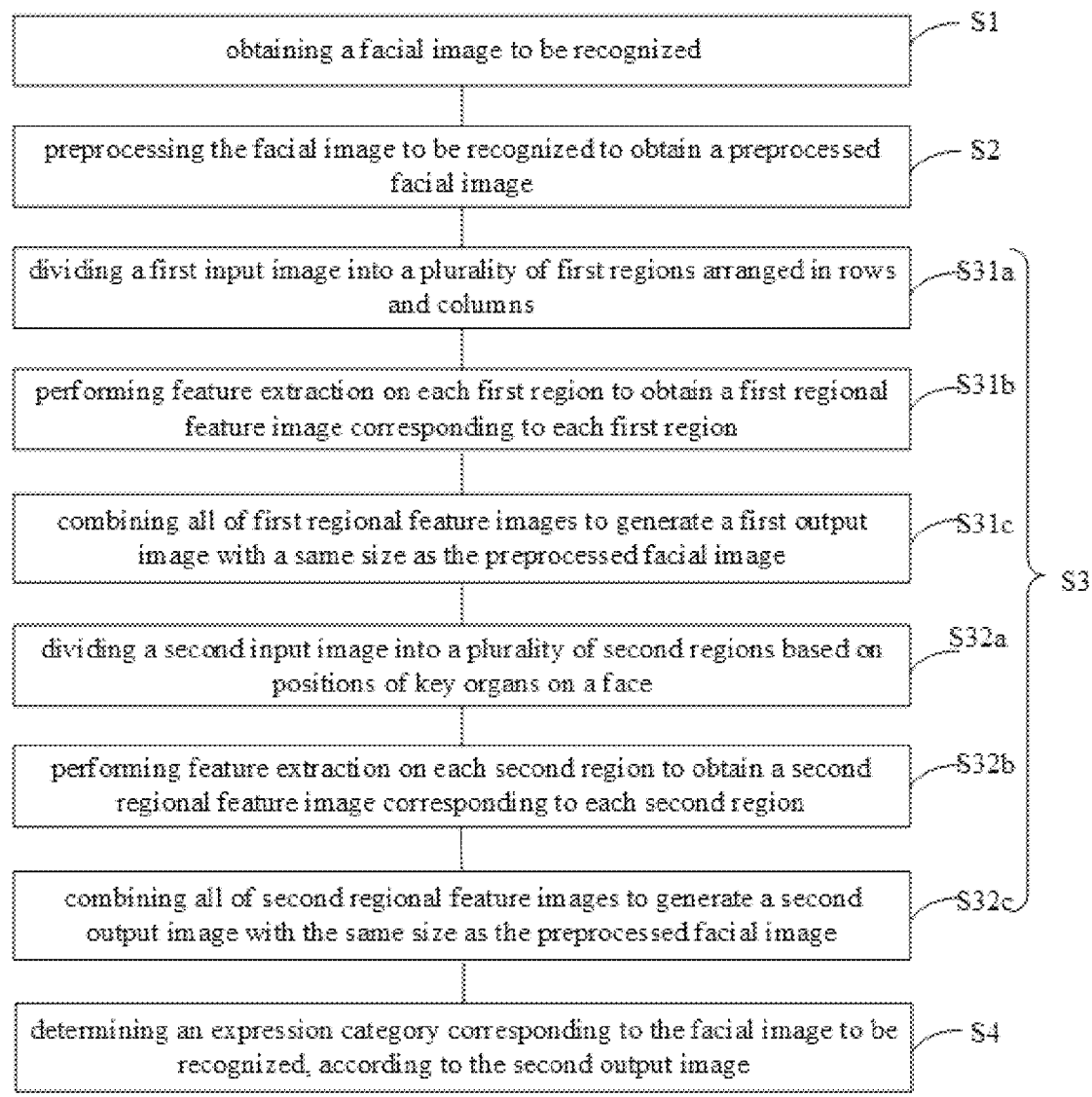
FIG. 1 is a flowchart of an expression recognition method according to an embodiment of the present disclosure.

An embodiment of the present disclosure provides an expression recognition method, which may be executed by a central processing unit (CPU). As shown in FIG. 1, it is a flowchart of an expression recognition method according to an embodiment of the present disclosure. The expression recognition method may include step S1, step S2, step S3, and step S4.

In step S1, a facial image to be recognized is obtained.

In step S2, the facial image to be recognized is preprocessed to obtain a preprocessed facial image.

According to an embodiment of the present disclosure, a preprocessing performed in step S2 may include an image enhancement process.

In step S3, a first partition convolution process and a second partition convolution process are performed sequentially on a first input image using a trained neural network. The first input image is obtained based on the preprocessed facial image. Exemplarily, the first input image may be the preprocessed facial image, or may be an image obtained by performing a further process e.g., a further partition convolution process) on the preprocessed facial image.

In step S3, performing the first partition convolution process on the first input image by using the trained neural network may include steps S31a, S31b and S31c.

In step S31a, the first input image is divided into a plurality of first regions arranged in rows and columns.

According to an embodiment of the present disclosure, when dividing the first input image into the plurality of first regions, the first input image itself may not be directly divided into the plurality of regions, but feature extraction may be performed on the first input image, and then a generated first feature image is divided into the plurality of first regions.

In step S31b, feature extraction is performed on each first region of the plurality of first regions into which the first input image is divided in step S31a, to obtain a first regional feature image corresponding to each first region. A size of the first regional feature image of each first region is smaller than a size of the preprocessed facial image.

According to an embodiment of the present disclosure, a size of an image may be a number of pixel rows and/or a number of pixel columns of the image.

In step S31c, all of first regional feature images obtained in step S31b are combined to generate a first output image with a same size as the preprocessed facial image. Region combination may refer to splicing multiple feature images with smaller sizes into a feature image with a larger size, and performing operations such as an activation process. A feature image herein may be matrices or vectors.

In step S3, performing the second partition convolution process by using the trained neural network may include steps S32a, S32b and S32c.

In step S32a, a second input image is divided into a plurality of second regions based on positions of key organs on a face, so that the key organs are located in different second regions of the plurality of second regions.

The second input image may be obtained based on the first output image of the first partition convolution process. In other words, the second partition convolution process may be performed at a deep layer of the neural network, and the first partition convolution process may be performed at a shallow layer of the neural network. Exemplarily, the second input image may be the first output image output by the first partition convolution process; and the second input image may also be an image obtained by performing a further process on the first output image, i.e., an image obtained by performing a further partition convolution process on the first output image.

The key organs on the face may refer to the organs that can directly affect the expression when their shape changes. According to an embodiment of the present disclosure, the key organs may include: eyes, a nose (especially the tip of the nose) and a mouth.

According to an embodiment of the present disclosure, similar to step S31a, when dividing the second input image into the plurality of second regions, the second input image itself may not be directly divided into the plurality of regions, but feature extraction may be performed on the second input image, and then a generated second feature image is divided into the plurality of second regions.

In step S32b, feature extraction is performed on each second region of the plurality of second regions into which the second input image is divided in step S32a, to obtain a second regional feature image corresponding to each second region.

In step S32c, all of second regional feature images obtained in step S32b are combined to generate a second output image with the same size as the preprocessed facial image.

In step S4, an expression category corresponding to the facial image to be recognized is determined, according to the second output image of the second partition convolution process.

When the neural network is used to process the image, features extracted in the shallow layer of the neural network are mainly detailed texture features; while features extracted in the deep layer of the neural network are more semantic features. Therefore, when expression recognition is performed on a facial image by using the neural network according to an embodiment of the present disclosure, in the first partition convolution process, the image (i.e., the first input image) is divided into the plurality of first regions arranged in rows and columns, and then the feature extraction is performed on each first region, so that the neural network pays more attention to detailed features of the image; while in the second partition convolution process after the first partition convolution process, the second input image is divided based on the positions of the key organs on the face, and the feature extraction is performed on each divided second region, so that the deep layer of the neural network may pay more attention to characteristics of the face organs. Furthermore, the expression recognition may be performed by combining the detailed features of the facial image with structural features of organs of the facial image, thereby improving the accuracy of the expression recognition.

According to an embodiment of the present disclosure, the neural network in the present disclosure may be obtained by training with Stochastic Parallel Gradient Descent Algorithm (SOD). Exemplarily, a neural network to be trained and facial image samples of preset various expression categories may be obtained firstly; and then, a certain number of the facial image samples are obtained and preprocessed each time, and the preprocessed facial image samples are input into the neural network for gradient descent iterative training, until a preset training condition is reached and the trained neural network is obtained. The preset training condition may be: a number of iterations reaching a preset number of times, or a value of a loss function being less than a preset value. Cross entropy may be used as the loss function.

The preset expression categories may include: happy, surprised, calm, sad, angry, disgusted, and/or feared. Of course, other numbers of and/or types of expression categories may also be preset.

Figure 2:
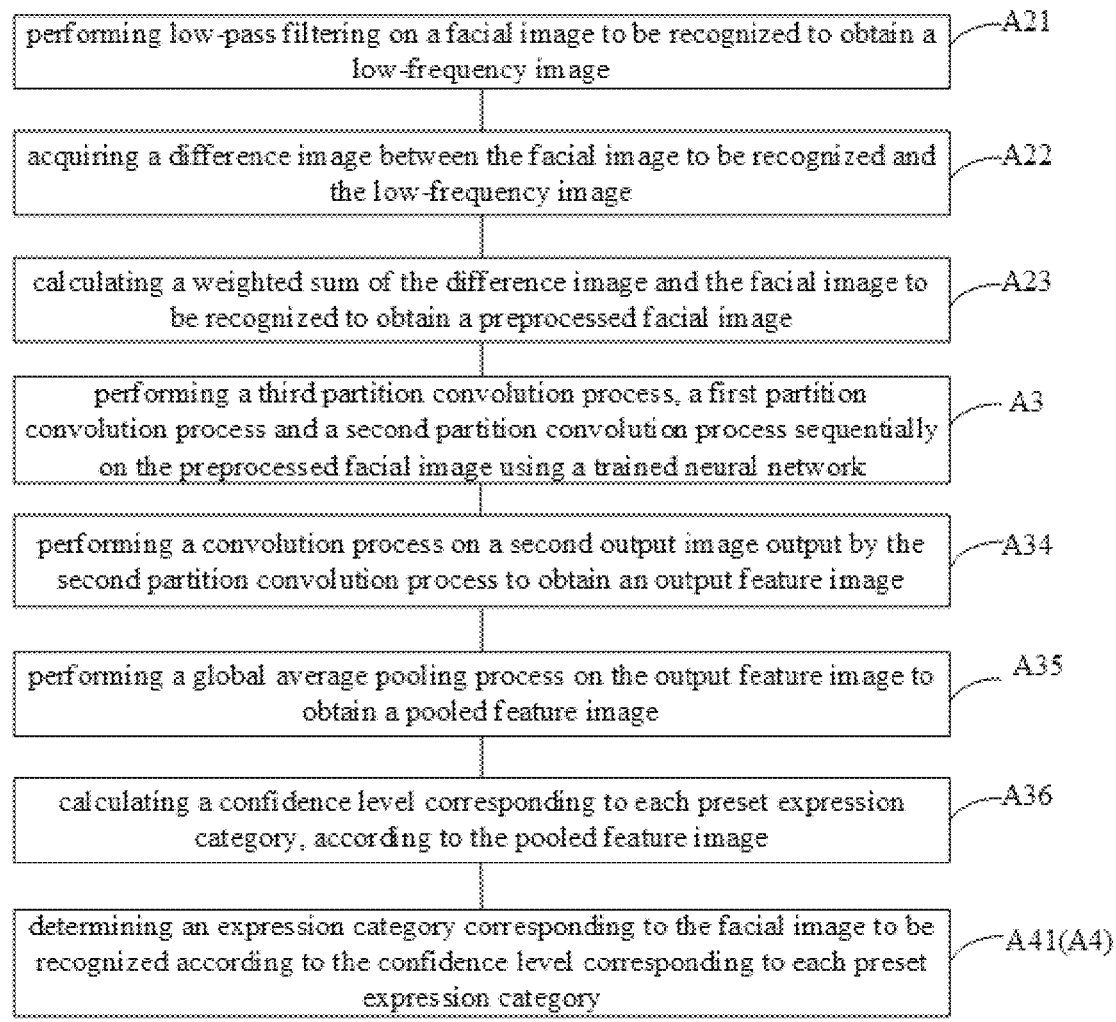
FIG. 2 is another flowchart of an expression recognition method according to an embodiment of the present disclosure.

As shown in FIG. 2, it is another flowchart of an expression recognition method according to an embodiment of the present disclosure. The expression recognition method may include step A1, step A2, step A3, and step A4.

In step A1 (not shown in FIG. 2), a facial image to be recognized is obtained.

In step A2 (not shown in FIG. 2), the facial image to be recognized is preprocessed to obtain a preprocessed facial image. The preprocessing may include an image enhancement process, exemplarily; may be an unsharp mask enhancement, so as to highlight texture details of the image, and may be an adjustment of a dynamic range of the image to make its grayscale performance more balanced, which helps improve the recognition effect.

According to an embodiment of the present disclosure, as shown in FIG. 2, step A2 may include step A21, step A22, and step A23.

In step A21, the facial image to be recognized is low-pass filtered to obtain a low-frequency image. A Gaussian filter G may be used to perform low-pass filtering on the facial image to be recognized I, thereby obtaining the low-frequency image $I_L$=I*G.

In step A22, a difference image $I_D$ between the facial image to be recognized I and the low-frequency image $I_L$ is acquired; wherein $I_D=I-I_L$, and the difference image $I_D$ is a detail image of the facial image to be recognized I.

In step A23, a weighted sum of the difference image $I_D$ and the facial image to be recognized I is calculated to obtain the preprocessed facial image $I_{OUT}$; wherein $I_{OUT}=I+\alpha \times I_D$, and $\alpha$ is a preset weight.

In step A3, a third partition convolution process, a first partition convolution process and a second partition convolution process are performed sequentially on the preprocessed facial image using a trained neural network.

Figure 3:
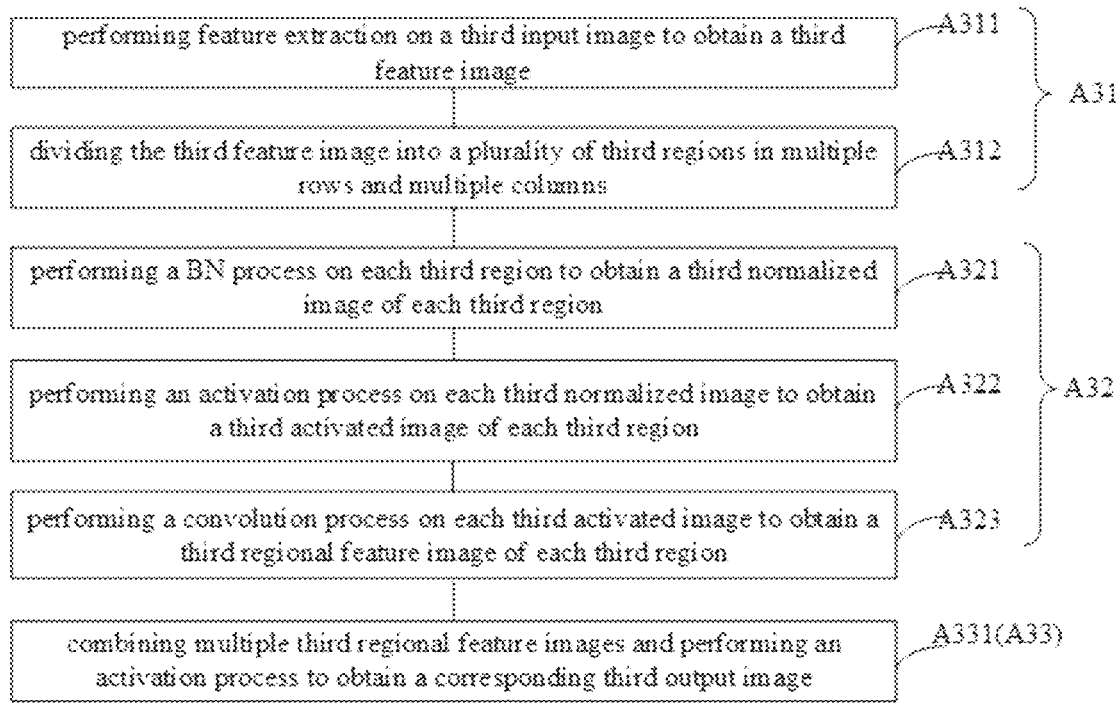
FIG. 3 is a flowchart of a third partition convolution process according to an embodiment of the present disclosure.

According to an embodiment of the present disclosure, the third partition convolution process is performed before the first partition convolution process. As shown in FIG. 3, it is a flowchart of a third partition convolution process according to an embodiment of the present disclosure. The third partition convolution process may include step A31, step A32, and step A33.

In step A31, a third input image of the third partition convolution process is divided into a plurality of third regions arranged in multiple rows and multiple columns. The third input image in step A31 (i.e., the input image of the third partition convolution process) may be the preprocessed facial image.

According to an embodiment of the present disclosure, step A31 may include steps A311 and A312.

In step A311, feature extraction is performed on the third input image to obtain a third feature image. It should be understood that each image obtained through the processing of the neural network is not a visualized picture, but an image feature vector or matrix capable of representing the image.

According to an embodiment of the present disclosure, step A311 may include: performing a convolution process on the third input image. At least one convolutional layer may be used to perform the convolution process on the third input image; for example, one convolutional layer may be used to perform the convolution process on the third input image, and the convolutional layer may include at least a 3×3 convolution kernel.

In step A312, the third feature image is divided into a plurality of third regions in multiple rows and multiple columns.

It can be understood that, when performing region division on the third feature image, exemplarily, data for characterizing different regions may be separately extracted from a matrix for characterizing the entire image. For example, when dividing a 100×100 image into regions arranged in two rows and two columns, data in rows 1 to 50 and columns 1 to 50 may be extracted as data in the first third region, and data in rows 51 to 100 and columns 1 to 50 may be extracted as data in the second third region; and so on.

Figure 5A:
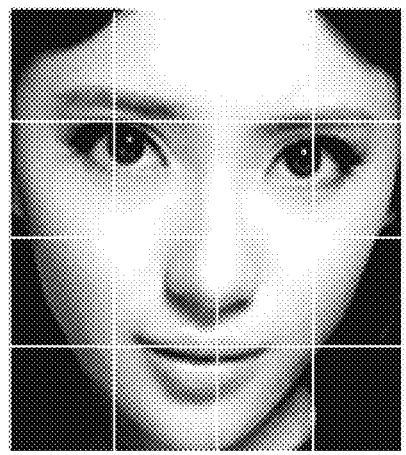
FIG. 5a is a schematic diagram of an arrangement manner of a plurality of third regions into which a third input image is divided in a third partition convolution process according to an embodiment of the present disclosure.

As shown in FIG. 5a, which is a schematic diagram of an arrangement manner of a plurality of third regions into which a third input image is divided in a third partition convolution process according to an embodiment of the present disclosure, in the third partition convolution process, the third input image is divided into a plurality of third regions arranged in 4 rows and 4 columns. Further, the sizes and shapes of the plurality of third regions are all the same.

It should be noted the number of rows and columns of the plurality of third regions into which the third input image is divided in the third partition convolution process is only an exemplary description; and the third input image may be divided into a plurality of third regions of other rows and columns according to a size of the third input image. For example, when the size of the third input image is 128×128 the third input image may be divided into a plurality of third regions in 8 rows and 8 columns.

In step A32, feature extraction is performed on each third region to obtain a third regional feature image of each third region. It should be noted that each third region for feature extraction performed in step A32 is a third region obtained in step A31.

As shown in FIG. 3, step A32 may include step A321, step A322, and step A323.

In step A321, a batch normalization (BN) process is performed on each third region to obtain a third normalized image of each third region, A BN layer of the neural network may be used to perform the BN process for each third region.

In step A322, an activation process is performed on each third normalized image to obtain a third activated image of each third region. An activation function of an activation layer may be used to activate each third normalized image, and the activation function may be a rectified linear unit (ReLU) activation function.

In step A323, a convolution process is performed on each third activated image to obtain a third regional feature image of each third region. The convolution process may be performed by at least one convolutional layer; for example, a convolutional layer may be used to perform the convolution process on each third activated image, and the convolutional layer may include multiple convolution kernels of 3×3. A size of each third regional feature image is the same as a size of a corresponding third region.

In step A33, all third regional feature images obtained in step A32 are combined to generate a third output image with a same size as the preprocessed facial image.

As shown in FIG. 3, step A33 may include step A331, and step A331 may include combining a plurality of third regional feature images and performing an activation process to obtain the corresponding third output image.

Performing the first partition convolution process using the neural network in step A3 may include steps S31a, S31b and S31c in FIG. 1.

In step S31a, the first input image is divided into the plurality of first regions arranged in rows and columns. At this time, the first input image may be the third output image output in step A33 by the third partition convolution process in step A3.

According to an embodiment of the present disclosure, in step S31a, the plurality of first regions into which the first input image is divided may also be arranged according to the arrangement in FIG. 5a; of course, the plurality of first regions may also be arranged in other rows and columns. Exemplarily, the first input image may be divided into 16 first regions arranged in 4 rows and 4 columns by the first partition convolution process. Further, the 16 first regions may all have a same size and shape.

Exemplarily, dividing the first input image into the plurality of first regions arranged in multiple rows and multiple columns may include: performing a convolution process on the first input image to obtain the first feature image; and dividing the first feature image into 16 first regions arranged in 4 rows and 4 columns.

In step S31b, feature extraction is performed on each first region of the plurality of first regions into which the first input image is divided in step S31a, to obtain the first regional feature image corresponding to each first region. The size of the first regional feature image of each first region is smaller than the size of the preprocessed facial image.

In step S31c, all of the first regional feature images obtained in step S31b are combined to generate the first output image with the same size as the preprocessed facial image.

The second partition convolution process may include step S32a, step S32b, and step S32c in FIG. 1.

Figure 4:
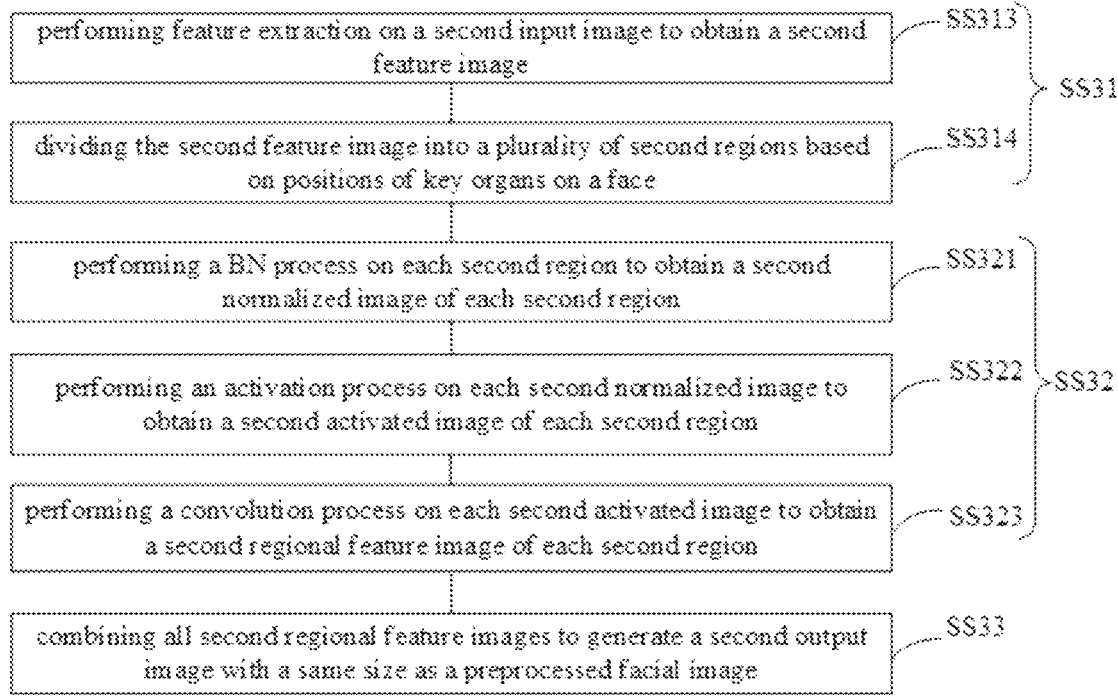
FIG. 4 is a flowchart of a second partition convolution process according to an embodiment of the present disclosure.

As shown in FIG. 4, it is a flowchart of a second partition convolution process according to an embodiment of the present disclosure. Performing the second partition convolution process using the neural network in step A3 may include step SS31, step SS32, and step SS33.

In step SS31, the second input image is divided into the plurality of second regions based on the positions of key organs on the face, so that the key organs are located in different second regions of the plurality of second regions. At this time, the second input image in step SS31 may be the first output image output in step S31c by the first partition convolution process in step A3.

Figure 5B:
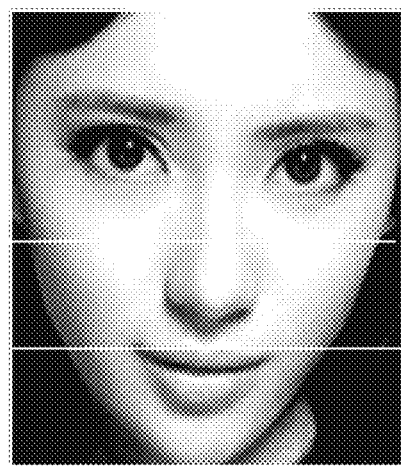
FIG. 5b is a schematic diagram of an arrangement manner of a plurality of second regions into which a second input image is divided in a second partition convolution process according to an embodiment of the present disclosure.

As shown in FIG. 5b, it is a schematic diagram of an arrangement manner of a plurality of second regions into which a second input image is divided in a second partition convolution process according to an embodiment of the present disclosure. The second input image may be divided into 3 second regions arranged in 3 rows and 1 column by the second partition convolution process, and these 3 second regions may correspond respectively to the eyes, the nose (especially the tip of the nose), and the mouth of the facial image. In a specific application, according to distribution characteristics of human face organs, an area of a top second region is half of an area of the second input image; an area of each of remaining two second regions is ¼ of the area of the facial image (i.e., the second input image), so that the eyes, the nose and the mouth are divided into three different second regions.

In an embodiment, step SS31 may include step SS313 and step SS314.

In step SS313, feature extraction is performed on the second input image to obtain the second feature image. The second input image of step SS313 (i.e., the input image of the second partition convolution process) may be the first output image output by the first partition convolution process in step S31c. A convolution process may be performed on the second input image using at least one convolutional layer.

In step SS314, the second feature image is divided into the plurality of second regions based on the positions of the key organs on the face. Exemplarily, the second feature image may be divided into three second regions based on the positions of the key organs on the face, so that the three second regions contain the eyes, the nose, and the mouth of the facial image, respectively.

In step SS32, feature extraction is performed on each second region to obtain the second regional feature image of each second region. A size of the second regional feature image of each second region is smaller than the size of the preprocessed facial image. In an embodiment, step SS32 may include step SS321, step SS322, and step SS323.

In step SS321, a BN process is performed on each second region to obtain a second normalized image of each second region.

In step SS322, an activation process is performed on each second normalized image to obtain a second activated image of each second region.

In step SS323, a convolution process is performed on each second activated image to obtain a second regional feature image of each second region.

In step A3, step SS32 in the second partition convolution process, step S31b in the first partition convolution process, and step A32 in the third partition convolution process are similar processes, except that three regions on which the feature extraction is performed are different. The respective second regions on which the feature extraction is performed in step SS32 in the second partition convolution process are the plurality of second regions divided in step SS31.

In step SS33, all second regional feature images are combined to generate the second output image with the same size as the preprocessed facial image.

In step A3, step SS33 in the second partition convolution process, step S31c in the first partition convolution process, and step A33 in the third partition convolution process are similar processes, except that regional feature images processed by the three are different. When generating the second output image in step SS33 in the second partition convolution process, the regional feature images used are the second regional feature images obtained in step SS32 in the second partition convolution process.

The specific processing on each second region in step SS32 and the specific process of generating the second output image in step SS33 may be referred to the above description, and will not be described here.

As shown in FIG. 2, after performing the second partition convolution process using the neural network in step A3, the expression recognition method may further include step A34, step A35, and step A36.

In step A34, a convolution process is performed on the second output image output by the second partition convolution process, to obtain an output feature image. At least one convolutional layer may be used to perform the convolution process on the second output image; for example, two convolutional layers may be used to perform the convolution process on the second output image, where one convolutional layer may include multiple convolution kernels of 1×1, and the other convolutional layer may include multiple convolution kernels of 3×3.

It should be noted that, in step A34, the convolution process may be directly performed on the second output image which is output by the second partition convolution process. Or at least one partition convolution process may be performed on the second output image first, for example, the second output image may be partitioned using a same partitioning method as the second partition convolution process, i.e., the partition convolution process of 3 rows and 1 column; and then the convolution process may be performed on the second output image on which the at least one partition convolution process has been performed.

In step A35, a global average pooling process is performed on the output feature image to obtain a pooled feature image. A global average pooling layer of the neural network may be used to perform the global average pooling process, and high-dimensional vectors may be converted into one-dimensional feature vectors by averaging, thereby reducing the amount of calculation.

In step A36, confidence levels respectively corresponding to respective preset expression categories are calculated, according to the pooled feature image.

Step A36 may be performed by a Softmax layer of the neural network. The Softmax layer may use a Softmax method to calculate a confidence level of each expression category. The confidence level P represents a probability that a sample vector x belongs to the j-th category, and its calculation formula is as follows:

$$P(y=j|x) = \frac{e^{x^T w_j}}{\sum_{k=1}^{K} e^{x^T w_k}}.$$

Where j is a serial number of an expression category, x is an input vector of the Softmax layer, w is a network weight parameter, and when the input vector of the Softmax layer is x, P(y=j|x) is a confidence level of that an expression category corresponding to x is the j-th expression category.

In step A4, the expression category corresponding to the facial image to be recognized is determined, according to the second output image output by the second partition convolution process.

According to an embodiment of the present disclosure, step A4 may include step A41, in which the expression category corresponding to the facial image to be recognized is determined according to a confidence level corresponding to each preset expression category.

In step A41, an expression category with a highest confidence level may be determined as the expression category corresponding to the facial image to be recognized.

It should be understood that the expression recognition method according to an embodiment of the present disclosure may further include performing other partition convolution process on the facial image to be recognized (or the preprocessed facial image) before the third partition convolution process. An image processing process of the third partition convolution process is similar to that of the first partition convolution process. In addition, after the second partition convolution process, other partition convolution process may also be performed on the second output image. A processing procedure of the partition convolution process performed on the image after the second partition convolution process is the same as that of the second partition convolution process.

Next, recognition results of the expression recognition method provided by the embodiments of the present disclosure are compared with those of other expression recognition methods. In an exemplary expression recognition method, processes of the third partition convolution process, the first partition convolution process, and the second partition convolution process are sequentially performed. In the third partition convolution process and the first partition convolution process, the plurality of third regions divided and the plurality of first regions divided are arranged in 4 rows and 4 columns respectively; and in the second partition convolution process, the plurality of second regions divided are arranged in three rows and one column. Table 1 shows a comparison of results of different expression recognition methods based on a data set CK+. The first column respectively lists four expression recognition methods such as the expression recognition method provided by the present disclosure, a method of one-time partition convolution, Inception V3 and FN2EN; the second column lists accuracy rates respectively corresponding to the above expression recognition methods when recognizing 6 expressions; and the third column lists accuracy rates respectively corresponding to the above expression recognition methods when recognizing 8 expressions. Among them, the method of one-time partition convolution may be that only the first partition convolution process is adopted, and the divided regions are arranged in 8 rows and 8 columns. The FN2EN is a method disclosed in a paper "H. Ding, S. Zhou, R. Challenge: Facenet2Expanet: Regularizing a Deep Face Recognition Net for Expression Recognition".

Table 2 shows a comparison of results of different expression recognition methods based on an FER2013 data set. The first column respectively lists three expression recognition methods such as the expression recognition method provided by the present disclosure, the Inception V3, and the method of one-time partition convolution, and each method is implemented based on a CPU. The second column lists a space occupied by respective models respectively corresponding to the above expression recognition methods. The third column lists accuracy rates respectively corresponding to the above expression recognition methods.

TABLE 1

| Method Name | Accuracy (6 expressions) | Accuracy (8 expressions) |
| --- | --- | --- |
| Method provided by the present disclosure | 0.992 | 0.978 |
| Method of one-time partition convolution | 0.949 | 0.942 |
| Inception V3 | 0.949 | 0.959 |
| FN2EN | 0.986 | 0.968 |

TABLE 2

| Method Name | Space (MB) | Accuracy |
| --- | --- | --- |
| Method provided by the present disclosure | 25.3 | 0.68 |
| Inception V3 | 87.6 | 0.59 |
| Method of one-time partition convolution | 61.7 | 0.56 |

As can be seen from the Tables 1 and 2, the recognition accuracy rate of the expression recognition method provided by the present disclosure is higher, and the space occupied by the calculation model is smaller.

Figure 6:
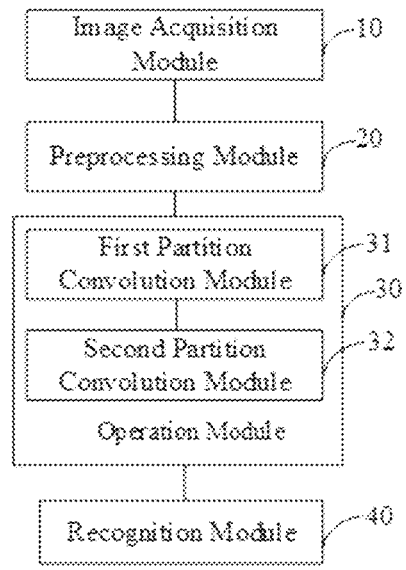
FIG. 6 is a schematic structural diagram of an expression recognition device according to an embodiment of the present disclosure.

An embodiment of the present disclosure provides an expression recognition device, which may be configured to perform the above expression recognition method. As shown in FIG. 6, which is a schematic structural diagram of an expression recognition device according to an embodiment of the present disclosure, the expression recognition device may include: an image acquisition module 10, a preprocessing module 20, an operation module 30, and a recognition module 40.

The image acquisition module 10 may be configured to acquire a facial image to be recognized.

The preprocessing module 20 may be configured to preprocess the facial image to be recognized to obtain the preprocessed facial image.

The operation module 30 may include: a first partition convolution module 31 and a second partition convolution module 32. The first partition convolution module 31 may be configured to perform a process of the first partition convolution process described above, and the second partition convolution module 32 may be configured to perform a process of the second partition convolution process described above.

Figure 7:
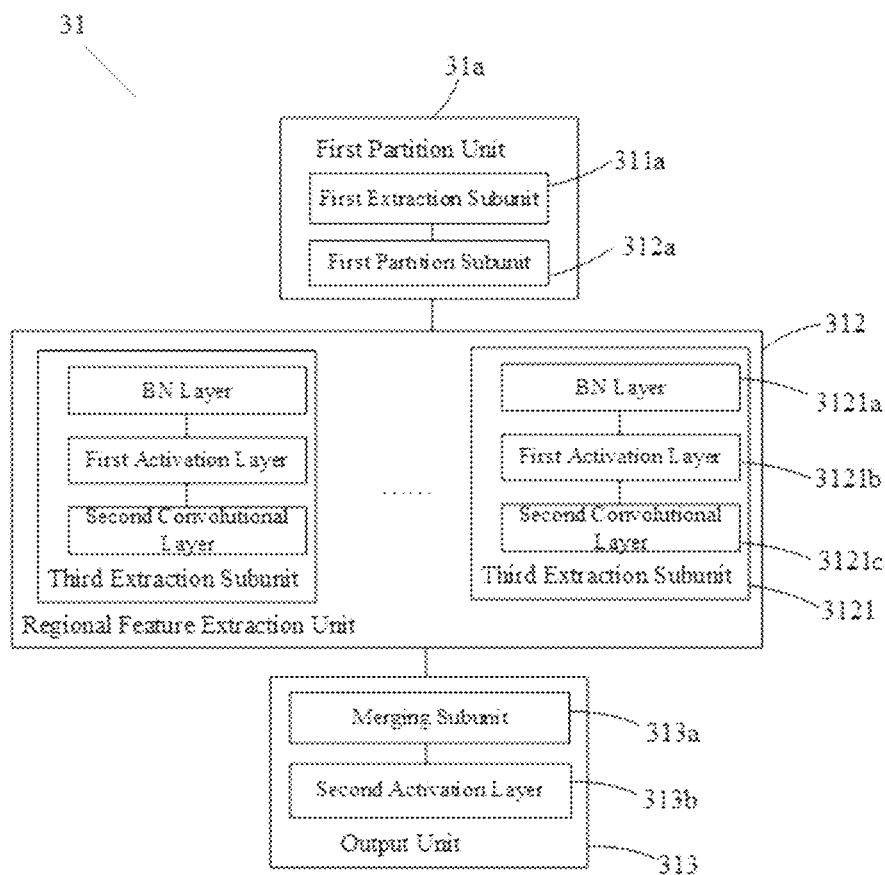
FIG. 7 is a schematic diagram of an optional structure of a first partition convolution module according to an embodiment of the present disclosure.

As shown in FIG. 7, it is a schematic diagram of an optional structure of the first partition convolution module 31 according to an embodiment of the present disclosure.

According to an embodiment of the present disclosure, the first partition convolution module 31 may include a first partition unit 31a.

The first partition unit 31a may be configured to divide a first input image input to the first partition convolution module 31 into a plurality of first regions arranged in multiple rows and multiple columns. The first input image may be obtained based on a preprocessed facial image. According to an embodiment of the present disclosure, the first partition unit 31a may divide the first input image into the plurality of first regions arranged in 4 rows and 4 columns, and the plurality of first regions have a same size and shape.

According to an embodiment of the present disclosure, the first partition unit 31a may include a first extraction subunit 311a and a first partition subunit 312a.

The first extraction subunit 311a may be configured to perform feature extraction on the first input image to obtain a first feature image. The first extraction subunit 311a may include a first convolutional layer, and the first convolutional layer may include a plurality of convolution kernels of 3×3.

The first partition subunit 312a may be configured to divide the first feature image into the plurality of first regions arranged in multiple rows and multiple columns.

Figure 8:
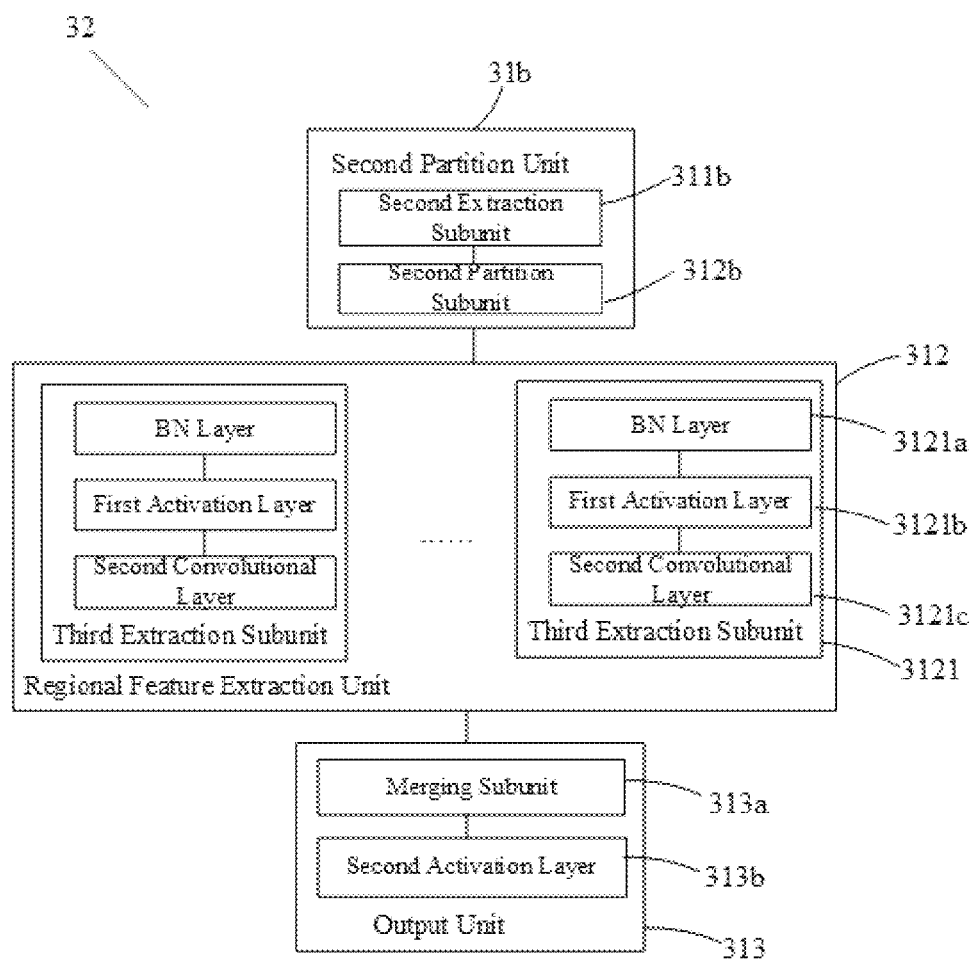
FIG. 8 is a schematic diagram of an optional structure of a second partition convolution module according to an embodiment of the present disclosure.

As shown in FIG. 8, it is a schematic diagram of an optional structure of a second partition convolution module according to an embodiment of the present disclosure. According to an embodiment of the present disclosure, the second partition convolution module 32 may include a second partition unit 31b.

The second partition unit 31b may be configured to divide a second input image input to the second partition convolution module 32 into a plurality of second regions based on positions of key organs on a face, so that the key organs are located in different second regions of the plurality of second regions. The second input image may be obtained based on the first output image output by the first partition convolution module 31. According to an embodiment of the present disclosure, the second input image may be obtained based on the first output image.

According to an embodiment of the present disclosure, the second partition unit 31b may divide the second input image input to the second partition convolution module 32 into the plurality of second regions arranged in 3 rows and 1 column, and the plurality of second regions may correspond to eyes, a nose, and a mouth of the facial image, respectively. According to an embodiment of the present disclosure, an area of a top second region may be half an area of the second input image, and an area of each of remaining two second regions may be ¼ of the area of the facial image.

The second partition unit 31b may include: a second extraction subunit 311b and a second partition subunit 312b. The second extraction subunit 311b may be configured to perform feature extraction on the second input image input to the second partition convolution module 32 to obtain a second feature image; and the second partition subunit 312b may be configured to divide the second feature image into the plurality of second regions based on the positions of the key organs on the face.

As shown in FIG. 7, the first partition convolution module 31 may further include a regional feature extraction unit 312 and an output unit 313. As shown in FIG. 8, the second partition convolution module 32 may also include the regional feature extraction unit 312 and the output unit 313. The regional feature extraction unit 312 in the first partition convolution module 31 and the regional feature extraction unit 312 in the second partition convolution module 32 may be set independently of each other, or may be integrated in a same functional module. The output unit 313 in the first partition convolution module 31 and the output unit 313 in the second partition convolution module 32 may be set independently of each other, or may be integrated in a same functional module.

The regional feature extraction unit 312 may be configured to perform feature extraction on each region (which may be the first region, the second region, or the third region) to obtain a regional feature image (which may be a first regional feature image, a second regional feature image, or a third regional feature image) of each region; and a size of the regional feature image of each region is smaller than a size of the preprocessed facial image.

According to an embodiment of the present disclosure, the regional feature extraction unit 312 may include a plurality of third extraction subunits 3121, and the plurality of third extraction subunits 3121 correspond to the plurality of regions (which may be the plurality of first regions, the plurality of second regions, or the plurality of third regions) one-to-one. The plurality of third extraction subunits 3121 may be configured to perform feature extraction on respective corresponding regions to obtain the regional feature image of each region (which may be the first regional feature image, the second regional feature image, or the third regional feature image).

A third extraction subunit 3121 may include a BN layer 3121a, a first activation layer 3121b, and a second convolutional layer 3121c. The BN layer 3121a is located before the first activation layer 3121b, and the first activation layer 3121b is located between the BN layer 3121a and the second convolutional layer 3121c.

According to an embodiment of the present disclosure, the output unit 313 may include: a merging subunit 313a and a second activation layer 313b. The merging subunit 313a may be configured to combine the plurality of regional feature images (which may be a plurality of first regional feature images, a plurality of second regional feature images, or a plurality of third regional feature images) to obtain a combined feature image with the same size as the preprocessed facial image. The second activation layer 313b may be configured to perform an activation process on the combined feature image to obtain a corresponding output image (which may be the first output image, a second output image, or a third output image).

Specific image processing functions of the regional feature extraction unit 312 and the output unit 313 may be referred to the related description above, which will not be repeated here.

The recognition module 40 may be configured to determine an expression category corresponding to the facial image to be recognized according to the second output image output by the second partition convolution module 32.

Figure 9:
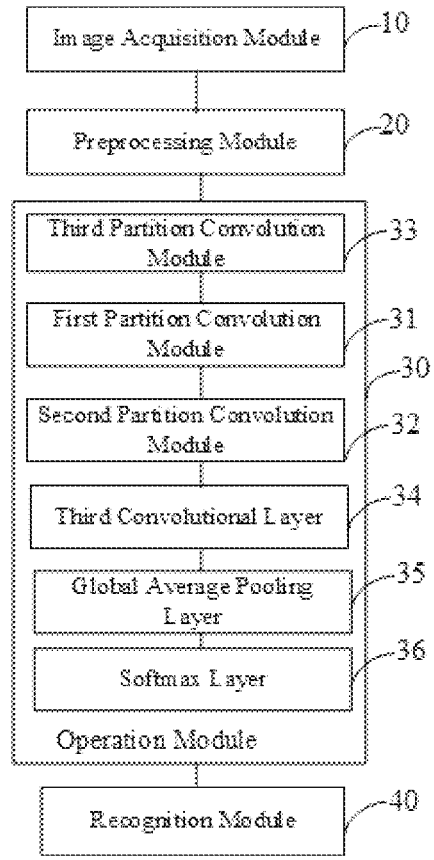
FIG. 9 is another schematic structural diagram of an expression recognition device according to an embodiment of the present disclosure.

As shown in FIG. 9, which is another schematic structural diagram of an expression recognition device according to an embodiment of the present disclosure, compared with the expression recognition device shown in FIG. 6, the operation module 30 of the expression recognition device in FIG. 9 may further include: a third partition convolution module 33, a third convolutional layer 34 after the second partition convolution module 32, a global average pooling layer 35 after the third convolutional layer 34, and a Softmax layer 36 after the global average pooling layer 35. The Softmax layer 36 may be configured to calculate a confidence level of each expression category based on received image data.

Figure 10:
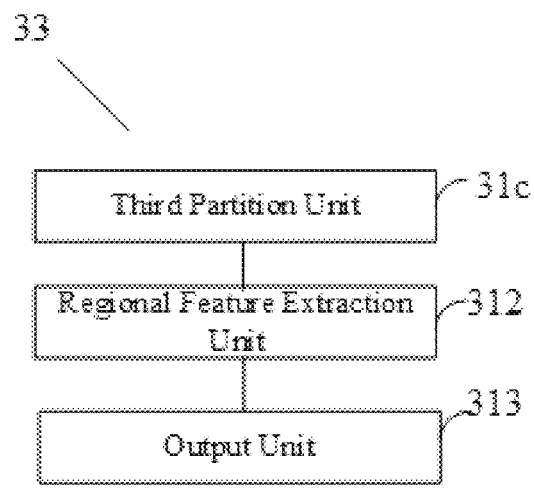
FIG. 10 is a schematic diagram of an optional structure of a third partition convolution module according to an embodiment of the present disclosure.

As shown in FIG. 10, it is a schematic diagram of an optional structure of a third partition convolution module according to an embodiment of the present disclosure.

According to an embodiment of the present disclosure, the third partition convolution module 33 may include: a third partition unit 31*c*, and the above-mentioned regional feature extraction unit 312 and output unit 313.

The third partition unit 31*c* may be configured to divide a third input image input to the third partition convolution module 33 into a plurality of third regions arranged in multiple rows and multiple columns. The third input image may be the preprocessed facial image, and the first input image input to the first partition convolution module 31 may be the third output image output by the third partition convolution module 33. The third partition unit 31*c* may adopt a same structure as the first partition unit 31*a*, thereby dividing the third input image input to the third partition unit 31*c* into the plurality of third regions.

The regional feature extraction unit 312 in the third partition convolution module 33 may perform feature extraction based on the plurality of third regions obtained by the third partition unit 31*c* to obtain a plurality of partition convolution images (i.e., the plurality of third regional feature images). The output unit 313 of the third partition convolution module 33 may generate the third output image according to the plurality of third regional feature images obtained by the regional feature extraction unit 312. The first input image input to the first partition unit 31*a* may be the third output image output by the third partition convolution module 33.

Specific structures of the regional feature extraction unit 312 and the output unit 313 may be referred to the related description above, and will not be repeated here.

In the expression recognition device shown in FIG. 9, the recognition module 40 may be configured to obtain a confidence level of each expression category, according to the second output image output by the second partition convolution module 32, and determine the expression category corresponding to the facial image to be recognized.

An operating principle of each module or each layer of the neural network has been introduced above, and will not be repeated here.

An embodiment of the present disclosure further provides a computer device, including one or more processors, and a memory. One or more programs are stored on the memory. The one or more programs is configured, when executed by the one or more processors, to implement the expression recognition method according to the embodiments of the present disclosure.

An embodiment of the present disclosure further provides a computer-readable storage medium having computer instructions stored thereon that, when executed by a processor, cause the processor to implement the expression recognition method according to the embodiments of the present disclosure.

The above-mentioned memory and computer-readable storage medium may include but are not limited to the following readable media: such as a random access memory (RAM), a read-only memory (ROM), a non-volatile random access memory (NVRAM), a programmable read-only memory (PROM), an erasable programmable read-only memory (EPROM), an electrically erasable PROM (EEPROM), a flash memory, a magnetic or optical data storage, a register, a magnetic disk or magnetic tape, an optical storage medium such as a compact disk (CD) or a digital versatile disk (DVD), and other non-transitory media. Examples of the processor may include but are not limited to a general-purpose processor, a CPU, a microprocessor, a digital signal processor (DSP), a controller, a microcontroller, a state machine and so on.

It can be understood that the above embodiments are merely exemplary embodiments adopted to explain the principles of the present disclosure, but the present disclosure is not limited thereto. For those skilled in the art, several improvements and modifications may be made without departing from the principles of the present disclosure, and these improvements and modifications should also be considered within the protection scope of the present disclosure.

The invention claimed is:

1. An expression recognition method, comprising:
   obtaining a facial image to be recognized;
   preprocessing the facial image to be recognized to obtain a preprocessed facial image;
   obtaining a first output image according to the preprocessed facial image, wherein the first output image at least represents a texture feature of the facial image to be recognized;
   obtaining a second output image according to the first output image, wherein the second output image at least represents a structural feature of organs of the facial image to be recognized; and
   determining an expression category corresponding to the facial image to be recognized, according to the second output image;
   wherein obtaining the first output image according to the preprocessed facial image, comprises:
   performing a first partition convolution process on a first input image to obtain the first output image, wherein the first input image is obtained based on the preprocessed facial image.

2. The expression recognition method of claim 1, wherein performing the first partition convolution process on the first input image to obtain the first output image, comprises:
   dividing the first input image into a plurality of first regions arranged in rows and columns;
   performing feature extraction on each first region of the plurality of first regions to obtain a first regional feature image corresponding to the first region; wherein a size of the first regional feature image is smaller than a size of the preprocessed facial image; and
   combining all of first regional feature images to generate the first output image with a same size as the preprocessed facial image.

3. The expression recognition method of claim 2, wherein dividing the first input image into the plurality of first regions arranged in rows and columns, comprises:
   performing a first convolution process on the first input image to obtain a first feature image; and
   dividing the first feature image into the plurality of first regions arranged in rows and columns.

4. The expression recognition method of claim 2, wherein dividing the first input image into the plurality of first regions arranged in rows and columns, comprises:
   dividing the first input image into the plurality of first regions which are of a same size and shape and arranged in rows and columns; and/or
   dividing the first input image into 16 first regions arranged in 4 rows and 4 columns.

5. The expression recognition method of claim 2, wherein performing the feature extraction on the first region to obtain the first regional feature image, comprises:
   performing a batch normalization process on the first region, to obtain a first normalized image of the first region;
   activating the first normalized image to obtain a first activated image; and performing a second convolution process on the first activated image to obtain the first regional feature image.

6. The expression recognition method of claim 1, before performing the first partition convolution process on the first input image to obtain the first output image, further comprising:
performing a third partition convolution process on a third input image to obtain a third output image;
wherein the third input image is obtained based on the preprocessed facial image, and the first input image is obtained based on the third output image.

7. The expression recognition method of claim 6, wherein performing the third partition convolution process on the third input image to obtain the third output image, comprises:
dividing the third input image into a plurality of third regions arranged in rows and columns;
performing feature extraction on each third region of the plurality of third regions to obtain a third regional feature image corresponding to the third region; wherein a size of the third regional feature image is smaller than a size of the preprocessed facial image; and
combining all of third regional feature images to generate the third output image with a same size as the preprocessed facial image.

8. The expression recognition method of claim 7, wherein dividing the third input image into the plurality of third regions arranged in rows and columns, comprises:
performing a first convolution process on the third input image to obtain a third feature image; and
dividing the third feature image into the plurality of third regions arranged in rows and columns.

9. The expression recognition method of claim 7, wherein dividing the third input image into the plurality of third regions arranged in rows and columns, comprises:
dividing the third input image into 16 third regions arranged in 4 rows and 4 columns.

10. The expression recognition method of claim 1, wherein obtaining the second output image according to the first output image, comprises:
performing a second partition convolution process on a second input image to obtain the second output image, wherein the second input image is obtained based on the first output image.

11. The expression recognition method of claim 10, wherein performing the second partition convolution process on the second input image to obtain the second output image, comprises:
dividing the second input image into a plurality of second regions based on positions of key organs on a face, so that the key organs are located in different second regions of the plurality of second regions;
performing feature extraction on each second region of the plurality of second regions to obtain a second regional feature image corresponding to the second region; wherein a size of the second regional feature image is smaller than a size of the preprocessed facial image; and
combining all of second regional feature images to generate the second output image with a same size as the preprocessed facial image.

12. The expression recognition method of claim 11, wherein dividing the second input image into the plurality of second regions, comprises:
performing a first convolution process on the second input image to obtain a second feature image; and
dividing the second feature image into the plurality of second regions.

13. The expression recognition method of claim 11, wherein dividing the second input image into the plurality of second regions, comprises:
dividing the second input image into 3 second regions arranged in 3 rows and 1 column, wherein the 3 second regions respectively correspond to eyes, a nose and a mouth in the facial image to be recognized.

14. The expression recognition method of claim 11, wherein performing the feature extraction on the second region to obtain the second regional feature image, comprises:
performing a batch normalization process on the second region, to obtain a second normalized image of the second region;
activating the second normalized image to obtain a second activated image; and
performing a second convolution process on the second activated image to obtain the second regional feature image.

15. The expression recognition method of claim 1, wherein preprocessing the facial image to be recognized to obtain the preprocessed facial image, comprises:
performing an image enhancement process on the facial image to be recognized to obtain an enhanced facial image.

16. The expression recognition method of claim 1, wherein preprocessing the facial image to be recognized to obtain the preprocessed facial image, comprises:
performing low-pass filtering on the facial image to be recognized to obtain a low-frequency image;
acquiring a difference image between the facial image to be recognized and the low-frequency image; and
determining a weighted sum of the difference image and the facial image to be recognized as the preprocessed facial image.

17. The expression recognition method of claim 1, wherein determining the expression category corresponding to the facial image to be recognized, according to the second output image, comprises:
performing a third convolution process on the second output image to obtain an output feature image;
performing a global average pooling process on the output feature image to obtain a pooled feature image;
determining confidence levels respectively corresponding to respective preset expression categories according to the pooled feature image; and
determining the expression category corresponding to the facial image to be recognized, according to the confidence levels respectively corresponding to the respective preset expression categories.

18. A computer device, comprising:
one or more processors; and
a memory, on which one or more programs are stored; wherein the one or more programs is configured, when executed by the one or more processors, to implement the expression recognition method of claim 1.

19. A non-transitory computer-readable storage medium having computer instructions stored thereon that, when executed by a processor, cause the processor to implement the expression recognition method of claim 1.

* * * * *